(12) United States Patent
Yoo et al.

(10) Patent No.: US 12,444,469 B2
(45) Date of Patent: Oct. 14, 2025

(54) NAND FLASH MEMORY DEVICE CAPABLE OF SELECTIVELY ERASING ONE FLASH MEMORY CELL AND OPERATION METHOD THEREOF

(71) Applicants: SK hynix Inc., Icheon (KR); Seoul National University R&DB Foundation, Seoul (KR)

(72) Inventors: Honam Yoo, Icheon (KR); Jong-Ho Lee, Seoul (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 602 days.

(21) Appl. No.: 17/715,809

(22) Filed: Apr. 7, 2022

(65) Prior Publication Data

US 2023/0128347 A1    Apr. 27, 2023

Related U.S. Application Data

(60) Provisional application No. 63/271,926, filed on Oct. 26, 2021.

(30) Foreign Application Priority Data

Dec. 17, 2021 (KR) .................. 10-2021-0182231

(51) Int. Cl.
  *G11C 16/16* (2006.01)
  *G11C 16/04* (2006.01)
  (Continued)

(52) U.S. Cl.
  CPC .......... *G11C 16/16* (2013.01); *G11C 16/0483* (2013.01); *G11C 16/08* (2013.01); *G11C 16/107* (2013.01); *G11C 16/24* (2013.01)

(58) Field of Classification Search
  CPC ..... G11C 16/16; G11C 16/0483; G11C 16/08; G11C 16/107; G11C 16/24;
  (Continued)

(56) References Cited

U.S. PATENT DOCUMENTS 7,907,450 B2    3/2011  Lue et al.
9,711,229 B1    7/2017  Rabkin et al.
(Continued)

OTHER PUBLICATIONS

S.T. Lee, and J.-H. Lee, "Neuromorphic Computing Using NAND Flash Memory Architecture With Pulse Width Modulation Scheme," Frontiers in Neuroscience, Sep. 18, 2020, pp. 1-10, vol. 14.
(Continued)

*Primary Examiner* — Amir Zarabian

(57) ABSTRACT

A flash memory device includes a cell array and a control circuit. The cell array includes a first NAND string having first flash memory cells having control gates respectively connected to word lines, and a first bit line selection switch connecting the first flash memory cells to a first bit line according to a control of a first string selection line. The control circuit controls a first erase operation for erasing a selected flash memory cell. The control circuit controls a voltage difference between the first bit line and the first string selection line to have a first value for generating gate induced drain leakage (GIDL) at the first bit line selection switch, and controls a voltage of a control gate of the selected flash memory cell and a voltage of a control gate of an unselected flash memory cell to be different from each other.

29 Claims, 12 Drawing Sheets

(51) Int. Cl.
    *G11C 16/08*    (2006.01)
    *G11C 16/10*    (2006.01)
    *G11C 16/24*    (2006.01)

(58) Field of Classification Search
    CPC ............... G11C 16/3436; G11C 11/54; G11C 2207/2263; G11C 16/10; G11C 16/14
    USPC .................................................... 365/185.33
    See application file for complete search history.

(56) References Cited

U.S. PATENT DOCUMENTS

| | | | | |
|---|---|---|---|---|
| 2014/0281769 | A1* | 9/2014 | Ohshima | G11C 29/42 714/721 |
| 2015/0155043 | A1* | 6/2015 | Yano | G11C 16/28 365/185.11 |
| 2016/0126248 | A1* | 5/2016 | Rabkin | H01L 29/66825 438/258 |
| 2016/0284413 | A1* | 9/2016 | Chang | G11C 16/0483 |
| 2018/0277222 | A1* | 9/2018 | Kondo | G11C 16/3481 |
| 2019/0035480 | A1* | 1/2019 | Lu | G11C 16/3427 |
| 2019/0378574 | A1* | 12/2019 | Lee | G11C 16/3495 |
| 2020/0002514 | A1* | 1/2020 | Yamanaka | A63B 37/0063 |
| 2020/0195404 | A1* | 6/2020 | Lee | H04W 52/34 |
| 2021/0391011 | A1* | 12/2021 | Ishida | G11C 16/0483 |

OTHER PUBLICATIONS

Chul-Heung Kim, et al., "Emerging memory technologies for neuromorphic computing," Nanotechnology, Nov. 13, 2018, pp. 1-33, vol. 30, issue 3, 032001.

Min-Kyu Jeong et al., "Analysis of Random Telegraph Noise and Low Frequency Noise Properties in 3-D Stacked NAND Flash Memory with Tube-Type Poly-Si Channel Structure," 2012 symposium on VLSI Technology Digest of Technical Papers, 2012, pp. 55-56, IEEE.

Ho-Nam Yoo, et al., "Effect of Lateral Charge Diffusion on Retention Characteristics of 3D Nand Flash Cells," Aug. 2021, pp. 1148-1151, IEEE Electron Device Letters.

Yosuke Komori, et al., "Disturbless flash memory due to high boost efficiency on BiCS structure and optimal memory film stack for ultra high density storage device," 2008 IEDM, Dec. 15-17, 2008, IEEE.

G. Ghibaudo, et al., "Improved Analysis of Low Frequency Noise in Field-Effect MOS Transistors," physica status solidi (a), 1991, pp. 571-581, vol. 124.

Karen Simonyan et al., "Very Deep Convolutional Networks for Large-Scale Image Recognition," Proc. Int. Conf. Learn, Apr. 10, 2015, pp. 1-14.

\* cited by examiner

FIG. 4

| BL | DSL | $V_{BL}$ | $V_{DSL}$ | $V_{GIDL}$ ($V_{BL} - V_{DSL}$) |
|---|---|---|---|---|
| Selected | Selected | 16 V | 10 V | 6 V (GIDL Erase) |
| Selected | Unselected | 16 V | 13 V | 3 V (No GIDL) |
| Unselected | Selected | 12 V | 10 V | 2 V (No GIDL) |
| Unselected | Unselected | 12 V | 13 V | -1 V (No GIDL) |

<Prior Art>

NAND FLASH MEMORY DEVICE CAPABLE OF SELECTIVELY ERASING ONE FLASH MEMORY CELL AND OPERATION METHOD THEREOF

CROSS-REFERENCE TO RELATED APPLICATION

The present application is related to and claims the benefit of U.S. Provisional Patent Application 63/271,926, filed on Oct. 26, 2021, and claims priority under 35 U.S.C. § 119(a) to Korean Patent Application No. 10-2021-0182231, filed on Dec. 17, 2021, which is incorporated herein by reference in its entirety.

BACKGROUND

1. Technical Field

Various embodiments generally relate to a NAND flash memory device capable of erasing one flash memory cell selected from among a plurality of flash memory cells included in a NAND string of the NAND flash memory device, and to an operation method thereof.

2. Related Art

In a conventional NAND flash memory device using a floating gate or a silicon/oxide/nitride/oxide/silicon (SONOS) structure, writing and erasing for a single flash memory cell are freely performed.

However, in a NAND flash memory device including a NAND string, a write operation for a single flash memory cell in the NAND string is possible, but an erase operation for a single flash memory cell in the NAND string is not possible and the erase operation should be performed by units of blocks.

That is, in the conventional NAND flash memory device, a write-protection condition exists for another flash memory cell during a write operation, but an erase-protection condition does not exist for another flash memory cell during an erase operation.

Such a problem exits not only in a NAND flash memory device having a two-dimensional structure but also in a NAND flash memory device having a three-dimensional structure.

In a conventional three-dimensional NAND flash memory device, an erase operation using gate induced drain leakage (GIDL) may be performed.

However, in the conventional NAND flash memory device, a condition for preventing other flash memory cells from being erased while performing an erase operation on a selected flash memory cell has not been developed.

When a write operation is performed for a single flash memory cell and an erase operation is performed for a block, data failure may occur in a specific flash memory cell when a threshold voltage characteristic of the specific flash memory cell is different from those of the other flash memory cells.

In order to solve this problem, an error correction technique can be adopted, which requires a lot of hardware and software resources.

Since it is impossible to perform an erase operation on a specific flash memory cell only in which an error has occurred, the erase operation should be performed on a block including the specific flash memory cell. As a result, the number of write operations and the number of erase operations performed on flash memory cells increase, and thus characteristics of the flash memory cells may be deteriorated easily.

This problem may occur more frequently as the number of data levels stored in one flash memory cell increases. Thus, this becomes a severe problem when the accuracy of data stored in each flash memory cell is important, e.g., in a neural network arithmetic circuit that stores weights using a NAND flash memory device.

SUMMARY

In accordance with an embodiment of the present disclosure, a flash memory device may include a cell array including a first NAND string having a plurality of first flash memory cells having control gates connected to a plurality of word lines respectively, and a first bit line selection switch connecting the plurality of first flash memory cells to a first bit line according to a control of a first string selection line; and a control circuit configured to control a first erase operation for erasing a selected flash memory cell among the plurality of first memory cells, wherein the control circuit controls a voltage difference between the first bit line and the first string selection line to have a first value for generating gate induced drain leakage (GIDL) at the first bit line selection switch, and controls a voltage of a control gate of the selected flash memory cell and a voltage of a control gate of an unselected flash memory cell among the plurality of first flash memory cells to be different from each other.

In accordance with an embodiment of the present disclosure, an operation method of a flash memory device may include reading a threshold voltage of a selected flash memory cell included in a NAND string of the flash memory device; erasing the selected flash memory cell when the threshold voltage is greater than an upper limit; and writing the selected flash memory cell when the threshold voltage is smaller than a lower limit.

In accordance with an embodiment of the present disclosure, an operation method of a flash memory device may include writing a selected flash memory cell included in a NAND string of the flash memory device when changing data of the selected flash memory cell into a first data; and erasing the selected flash memory cell when changing data of the selected flash memory cell into a second data.

In accordance with an embodiment of the present disclosure, an operation method of a flash memory device may include writing a predetermined number of flash memory cells included in a block including a plurality of NAND strings each including a plurality of flash memory cells; reading a threshold voltage of a selected flash memory cell among the predetermined flash memory cells; and comparing the threshold voltage of the selected flash memory cell with a target value and writing or erasing the selected flash memory cell according to a comparison result.

In accordance with an embodiment of the present disclosure, an operation method of a flash memory device may include reading a turn-on current flowing through a selected flash memory cell among a plurality of flash memory cells included in a NAND string of the flash memory device; and comparing the turn-on current with a threshold value and erasing or writing the selected flash memory cell according to a comparison result.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

FIG. 4 is a table showing an erase condition of a flash memory cell of a flash memory device according to an embodiment of the present disclosure.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
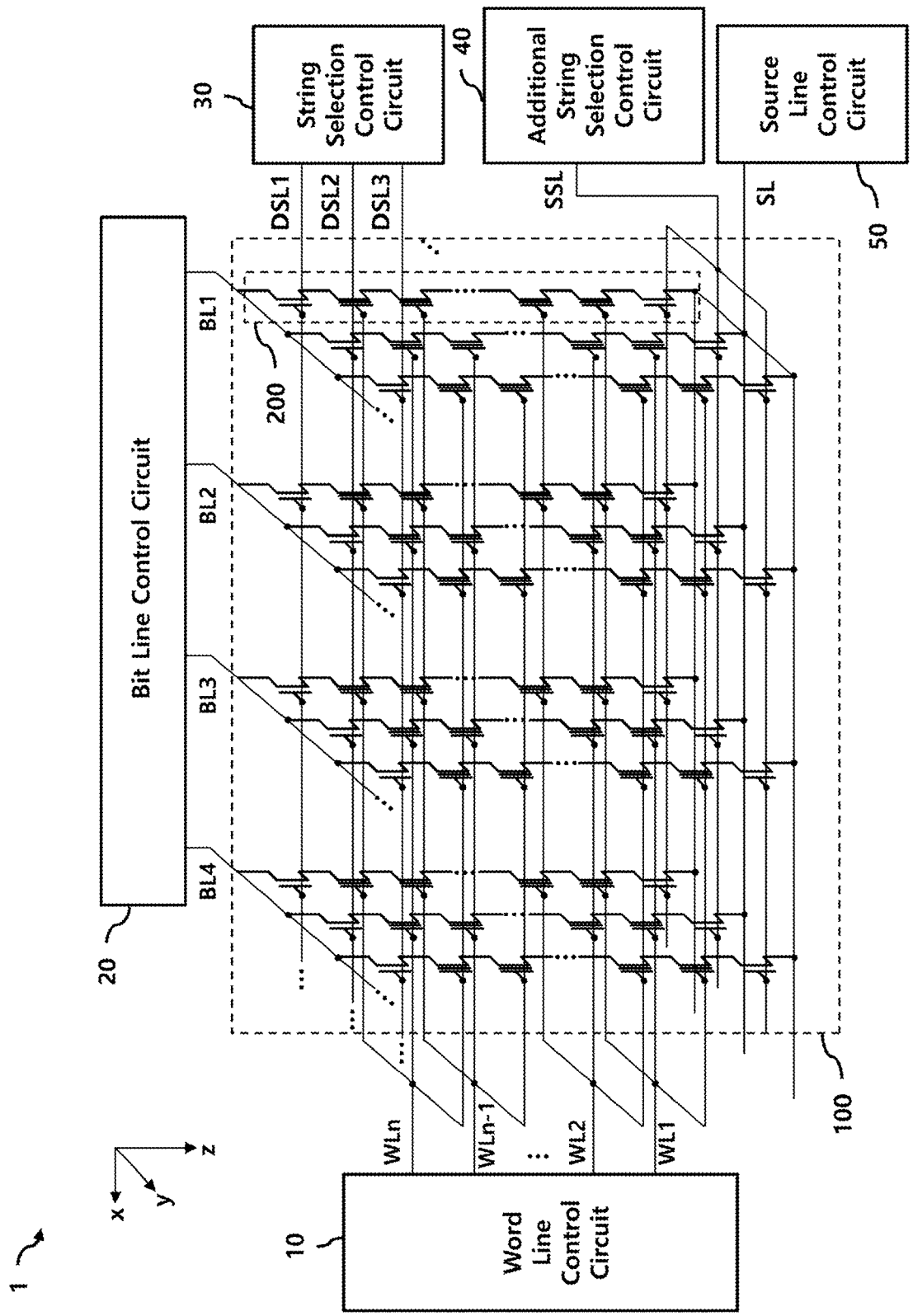
FIG. 1 illustrates a flash memory device according to an embodiment of the present disclosure.

FIG. 1 illustrates a flash memory device 1 according to an embodiment of the present disclosure.

The flash memory device 1 includes a cell array 100 including a plurality of NAND strings 200, a word line control circuit 10 for controlling word lines, e.g., WL1 to WLn, of the cell array 100, a bit line control circuit 20 for controlling bit lines, e.g., BL1 to BL4, of the cell array 100, a first string selection control circuit 30 for controlling first string selection lines, e.g., DSL1 to DSL3, of the cell array 100, a second string selection control circuit 40 for controlling a second string selection line SSL of the cell array 100, and a source line control circuit 50 for controlling a source line SL of the cell array 100.

The word line control circuit 10, the bit line control circuit 20, the first string selection control circuit 30, the second string selection control circuit 40, and the source line control circuit 50 may be collectively referred to as a control circuit.

That is, in the present embodiment, the control circuit performs a cell erase operation on a single flash memory cell by controlling the word lines WL1 to WLn, the bit lines BL1 to BL4, the fist string selection lines DSL1 to DSL3, the second string selection line SSL, and the source line SL.

Figure 2:
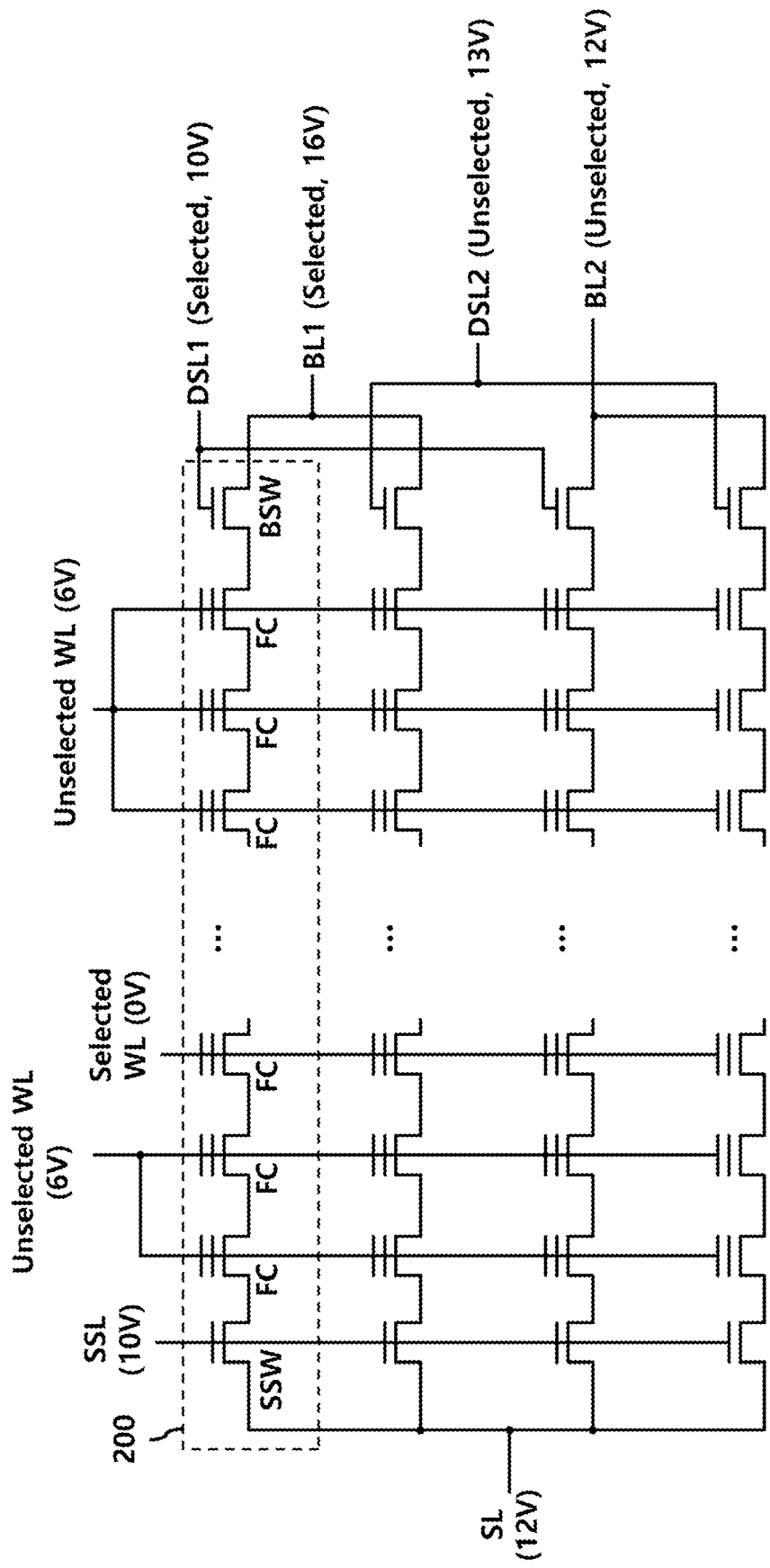
FIGS. 2 and 3 illustrate an erase condition of a flash memory cell of a flash memory device according to an embodiment of the present disclosure.

FIG. 2 illustrates four NAND strings connected to two adjacent bit lines and two string selection lines of FIG. 1.

Referring to FIG. 2, a NAND string 200 is a structure generally used in a NAND flash memory device. The NAND string 200 includes a bit line selection switch BSW, a plurality of flash memory cells FC, and a source line selection switch SSW that are sequentially connected between a bit line BL and a source line SL.

In this embodiment, the bit line selection switch BSW and the source line selection switch SSW are NMOS transistors.

A first string selection line DSL is connected to a gate of the bit line selection switch BSW, a plurality of word lines WL are respectively connected to control gates of the plurality of flash memory cells FC, and a second string selection line SSL is connected to a gate of the source line selection switch SSW. Hereinafter, the first string selection line DSL may be referred to as a drain selection line. The second string selection line SSL may be referred to as a source selection line.

Since the bit line selection switch BSW and the source line selection switch SSW perform a function of selecting a NAND string, they may be referred to as string selection switches.

In the present embodiment, since the bit line selection switch BSW and the source line selection switch SSW are NMOS transistors, a region connected to the bit line BL and a region connected to the source line SL are doped with N-type impurities.

On the other hand, when the bit line selection switch BSW and the source line selection switch SSW are PMOS transistors, voltages applied to the bit line BL, the source line SL, the first string selection line DSL, and the second string selection line SSL may be changed. This can be easily understood by a person skilled in the art from the disclosure of the present invention, and thus the specific disclosure thereof is omitted.

Returning to FIG. 1, in the cell array 100, the plurality of NAND strings 200 are arranged in two dimensions, and thus a plurality of flash memory cells is arranged in three dimensions.

One word line is commonly connected to control gates of a plurality of flash memory cells of a plurality of NAND strings, the plurality of flash memory cells being positioned on a plane, e.g., an x-y plane, perpendicular to the z-axis.

One bit line BL is commonly connected to drains of a plurality of bit line selection switches BSW of a plurality of NAND strings, the plurality of bit line selection switches BSW being positioned on a plane, e.g., a y-z plane, perpendicular to the x-axis.

One first string selection line DSL is commonly connected to gates of a plurality of bit line selection switches BSW of a plurality of NAND strings, the plurality of bit line selection switches BSW being positioned on a plane, e.g., a x-z plane, perpendicular to the y-axis.

The source line SL is commonly connected to sources of source line selection switches of all the plurality of NAND strings 200.

The second string selection line SSL is commonly connected to gates of the source line selection switches of all the plurality of NAND strings 200.

The cell array 100 has substantially the same configuration as the conventional cell array.

The present disclosure provides a technique for selecting and erasing one flash memory cell without changing the configuration of the cell array 100.

In this embodiment, the word line control circuit 10 provides different voltage signals to a word line to which a selected flash memory cell is connected and a word line to which an unselected flash memory cell is connected.

In this embodiment, the bit line control circuit 20, the first string selection control circuit 30, the second string selection control circuit 40, and the source line control circuit 50 respectively set voltages of a bit line BL, a first string selection line DSL, the second string selection line SSL, and the source line SL according to a predetermined condition, and generate gate induced drain leakage (GIDL) in a NAND string 200 in which the selected flash memory cell is located.

Holes generated by the GIDL are supplied to a channel of the NAND string 200 to move electrons stored in a charge storage layer of a flash memory cell FC to the channel, or holes are stored in the charge storage layer to lower a threshold voltage of the flash memory cell FC, so that an erase operation is performed on the flash memory cell FC.

FIG. 2 illustrates an operation of erasing one flash memory cell in the flash memory device 1 of FIG. 1 according to an embodiment of the present disclosure, and FIG. 4 is a table showing voltages of a bit line BL and a first string selection line DSL of FIG. 2.

In this embodiment, 6V is applied to a word line connected to an unselected flash memory cell FC, and 0V is applied to a word line connected to a selected flash memory cell FC. Hereinafter, the word line connected to the selected flash memory cell FC is referred to as a selected word line, and the word line connected to the unselected flash memory cell FC is referred to as an unselected word line.

In this embodiment, 16V is applied to a bit line BL1 connected to the selected flash memory cell FC, and 12V is applied to a bit line BL2 connected to an unselected flash memory cell FC. Hereinafter, the bit line connected to the selected flash memory cell FC is referred to as a selected bit line, and the bit line BL2 connected to the unselected flash memory cell FC is referred to as an unselected bit line.

10V is applied to a first string selection line DSL1 connected to a bit line selection switch BSW to which the selected flash memory cell FC is connected, and 13V is applied to a first string selection line DSL2 connected to a bit line selection switch BSW to which an unselected flash memory cell FC is connected.

Hereinafter, the first string selection line DSL1 connected to the selected flash memory cell FC is referred to as a selected first string selection line, and the first string selection line DSL2 connected to the unselected flash memory cell FC is referred to as an unselected first string selection line.

In FIG. 2, an erase operation is performed only on one selected flash memory cell FC that is connected to the selected word line WL, the selected bit line BL1, and the selected first string selection line DSL1, and the erase operation is not performed on the other unselected flash memory cells.

A voltage obtained by subtracting a voltage $V_{DSL}$ of the first string selection line DSL from a voltage $V_{BA}$ of the bit line BL or a voltage obtained by subtracting a voltage $V_{sa}$ of the second string selection line SSL from a voltage $V_{SL}$ of the source line SL may be expressed as a GIDL voltage $V_{GIDL}$.

The GIDL voltage $V_{GIDL}$ has one of four combinations as shown in FIG. 4 depending on whether a bit line BL and a first string selection line DSL are selected or not.

In this embodiment, the GIDL voltage $V_{GIDL}$ between the selected bit line BL1 and the selected first string selection line DSL1 satisfies an erase condition by GIDL, otherwise the erase operation by the GIDL is suppressed.

In the present embodiment, when the GIDL voltage $V_{GIDL}$ is 6V or more, the erase condition by the GIDL is satisfied. On the other hand, when the GIDL voltage $V_{GIDL}$ is less than 6V, the erase operation is suppressed.

In the present embodiment, 0V is applied to the selected word line connected to the selected flash memory cell FC, and 6V is applied to the unselected word line connected to the unselected flash memory cell FC. Therefore, holes move to a charge storage layer of the selected flash memory cell FC or electrons move from the charge storage layer to a channel, so that a threshold voltage of the selected flash memory cell FC is reduced.

When a lower voltage, for example, a negative voltage, is provided to the selected word line, holes can migrate to the charge storage layer in a shorter time.

In the present embodiment, since 12V is applied to the source line SL and 10V is applied to the second string selection line SSL, the GIDL voltage $V_{GIDL}$ at a source line side becomes 2V.

Accordingly, in the present embodiment, the GIDL does not occur at the source line side and the GIDL occurs only at a bit line side.

Power consumption may be reduced by reducing a current flowing between the bit line BL and the source line SL in the operation of erasing only the selected flash memory cell FC.

When the voltage $V_{sa}$ applied to the second string selection line SSL is 10V, the source line selection switch SSW is turned off to cut off the current flowing between the bit line BL and the source line SL.

When erasing one selected flash memory cell as in the present embodiment, it may be advantageous to cut off the generation of the GIDL at the source line side to reduce the power consumption.

Even when an erase operation of one selected flash memory cell is performed, a block erase operation may be required.

In order to perform the block erase operation, the voltage $V_{SL}$ of the source line SL may be increased to 16V and voltages of all word lines may be set to 0V.

Since the source line SL is commonly connected to all the NAND strings 200, the block erase operation may be performed more simply than adjusting voltages of all bit lines and voltages of all string selection lines.

The bit line voltage $V_{BL}$ or the source line voltage $V_{SL}$ may be referred to as an erase voltage $V_{erase}$ or an erase bias.

The erase voltage $V_{erase}$ may affect the erase operation together with the GIDL voltage $V_{GIDL}$. For example, when the GIDL voltage $V_{GIDL}$ is fixed, the erase performance may be improved as the erase voltage $V_{erase}$ increases.

Figure 3:
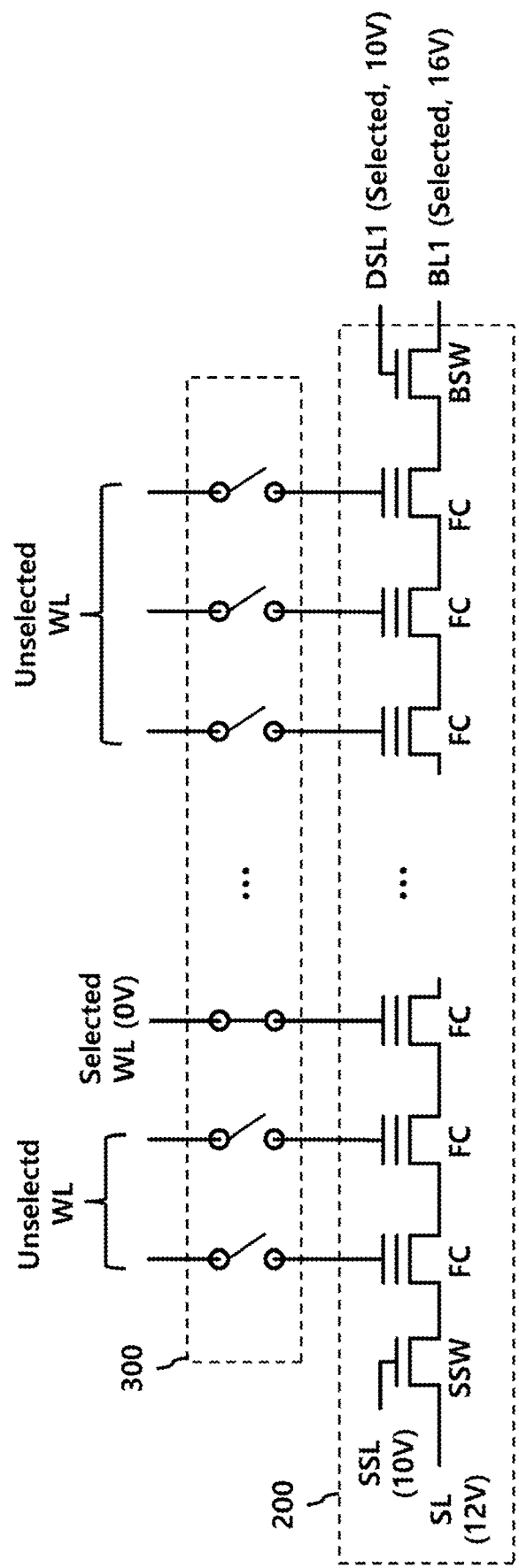

FIG. 3 illustrates a cell erase operation for a selected flash memory cell of the flash memory device 1 of FIG. 1.

In the embodiment of FIG. 3, the memory cell array 100 further includes a plurality of switches 300, and the plurality of switches 300 connect a plurality of word lines to control gates of a plurality of flash memory cells, respectively.

The word line control circuit 10 may additionally control the plurality of switches 300 to perform the cell erase operation.

The word line control circuit 10 controls the plurality of switches 300 so that a selected flash memory cell to be erased is connected to a corresponding word line of the plurality of word lines and unselected flash memory cells not to be erased are separated from corresponding word lines of the plurality of word lines.

In the present embodiment, a low voltage, for example, 0V, is applied to a control gate of the selected flash memory cell to be erased as shown in FIG. 3, so that holes move into a charge storage layer of the selected flash memory cell.

On the other hand, a control gate of an unselected flash memory cell on which the erase operation is not to be performed is not connected to a corresponding word line.

In this case, a positive body voltage may be applied to the control gate of the unselected flash memory cell, so that the control gate of the unselected flash memory cell may have a voltage greater than 0V.

In an embodiment, before the cell erase operation starts, a positive voltage is applied to a word line connected to an unselected flash memory cell in advance. After that, when the cell erase operation starts, a switch connected to the unselected flash memory cell is turned off. Therefore, it is possible to prevent the cell erase operation from being performed on the unselected flash memory cell.

In another embodiment, a word line voltage 0V of the selected flash memory cell may be connected to a control gate of an unselected flash memory cell adjacent to the selected flash memory cell. To prevent this, a positive voltage, e.g., 6V, may be applied as shown in FIG. 2 to control gates of one or more unselected flash memory cells adjacent to the selected flash memory cell, and control gates of the remaining unselected flash memory cells may be set to be in a floating state as shown in FIG. 3.

In this case, the number of adjacent unselected flash memory cells to which the positive voltage is applied may be changed by a person skilled in the art according to an embodiment.

Figure 5A:
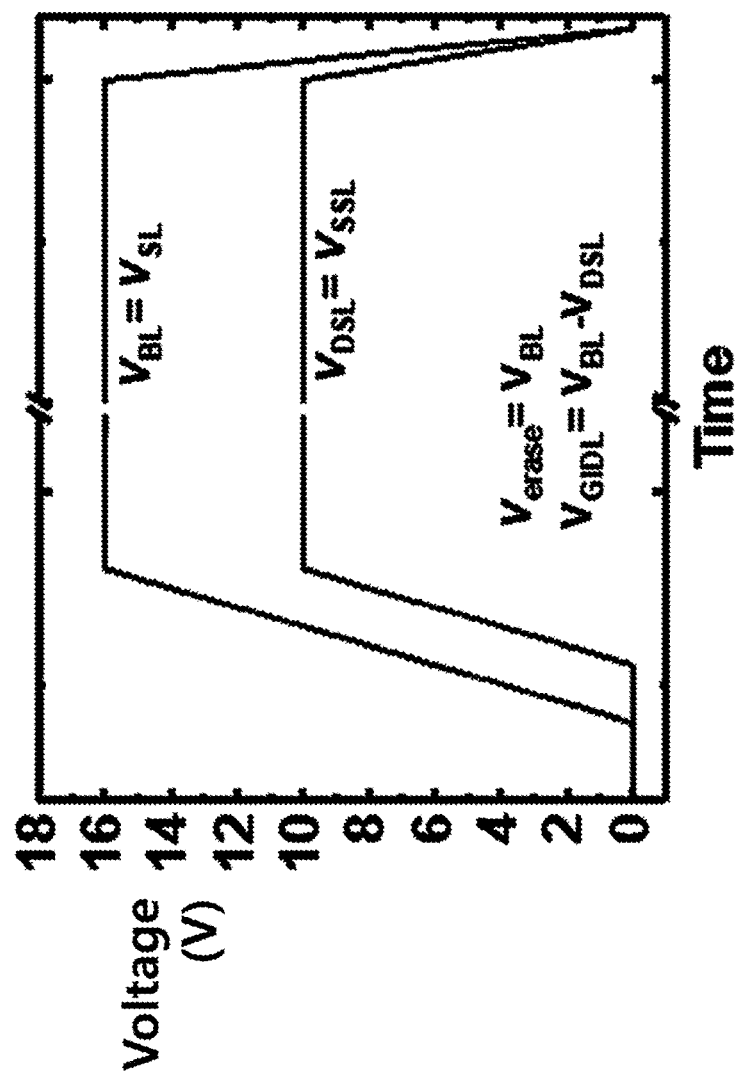
FIG. 5A is a graph showing an erase condition of a conventional flash memory device.
Figure 5B:
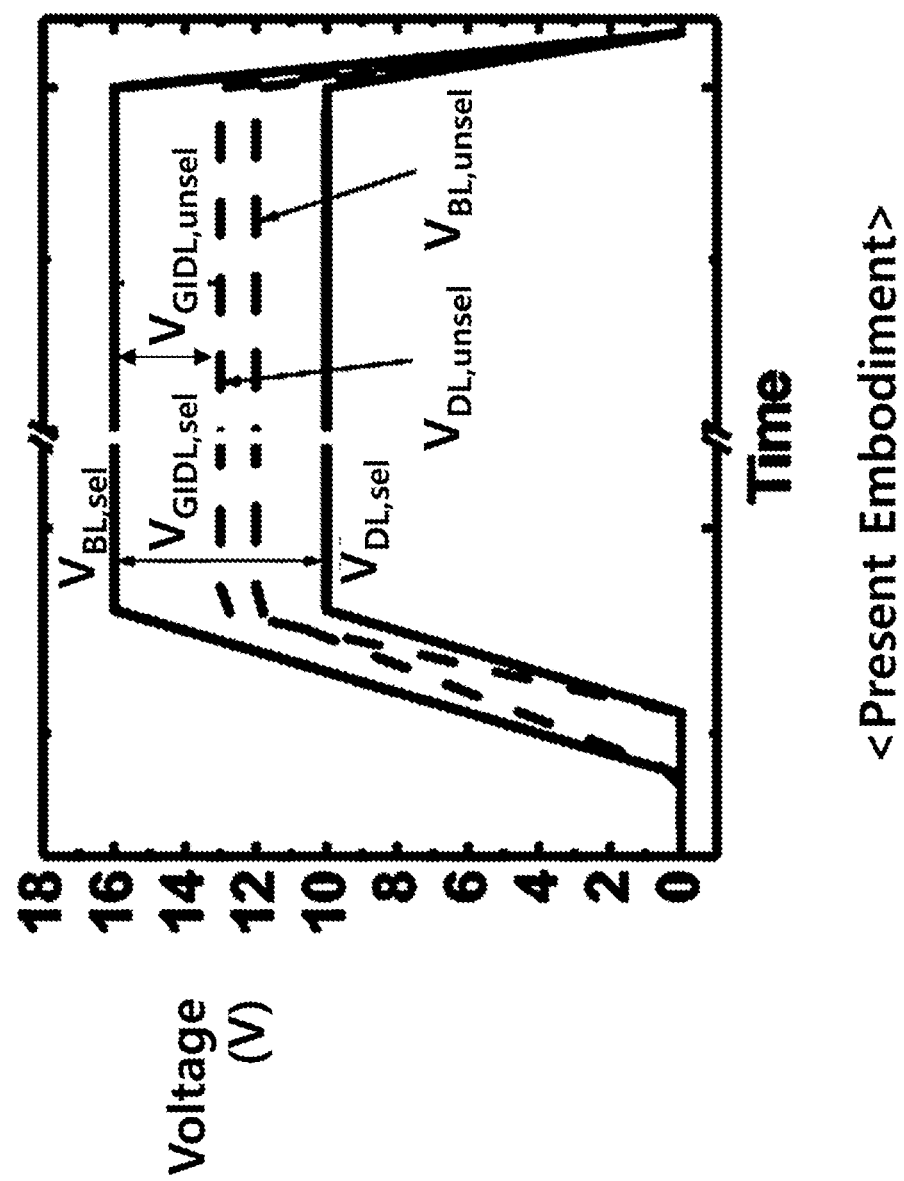
FIG. 5B is a graph showing an erase condition of a flash memory cell of a flash memory device according to an embodiment of the present disclosure.

FIGS. 5A and 5B comparatively show erase operations of a flash memory device.

FIG. 5A is a graph illustrating a block erase condition of a conventional flash memory device.

Conventionally, during the block erase operation, voltages $V_{BL}$ of all bit lines BL and a voltage $V_{SL}$ of a source line SL included in a block rise to, for example, 16V.

When the voltage $V_{BL}$ of the bit line BL and the voltage $V_{SL}$ of the source line SL are initially increased, a first string selection line DSL and a second string selection line SSL maintain a low voltage, for example, 0V.

When the voltage $V_{BL}$ of the bit line BL and the voltage $V_{SL}$ of the source line SL rise above a certain level, a voltage $V_{DSL}$ of the first string selection line DSL and a voltage $V_{SSL}$ of the second string selection line SSL start to rise.

The voltage $V_{DSL}$ of the first string selection line DSL and the voltage $V_{sa}$ of the second string selection line SSL maintain, for example, 10V, while the voltage $V_{BL}$ of the bit line BL and the voltage $V_{SL}$ of the source line SL maintain 16V.

At this time, when a low voltage, for example, 0V, is applied to control gates of all flash memory cells FC included in the block, an electron-hole pair is generated due to GIDL, and thus an erase operation is performed on all flash memory cells FC by the GIDL.

FIG. 5B is a graph explaining a cell erase operation for a selected flash memory cell in accordance with an embodiment.

Unlike FIG. 5A, voltage conditions for an unselected bit line and an unselected first string selection line are additionally set for the cell erase operation on the selected flash memory cell.

In this embodiment, a voltage $V_{BL,unsel}$ of an unselected bit line rises together with a voltage $V_{BL,sel}$ of a selected bit line, but rises to a lower voltage, for example, 12V, than the voltage $V_{BL,sel}$ of the selected bit line that is 16V.

Also, a voltage $V_{DL,unsel}$ of an unselected first string selection line rises along with a voltage $V_{DL,sel}$ of a selected first string selection line, but rises to a higher voltage, for example, 13V, than the voltage $V_{DL,sel}$ of the selected first string selection line that is 10V.

Accordingly, a GIDL voltage $V_{GIDL,sel}$ between the selected bit line and the selected first string selection line satisfies the condition for an erase operation by GIDL.

On the other hand, a GIDL voltage $V_{GIDL,unsel}$ between the unselected bit line and an arbitrary first string selection line or between an arbitrary bit line and the unselected first string selection line does not satisfy the condition for the erase operation by GIDL, and thus an erase operation is suppressed for an unselected flash memory cell.

Figure 6:
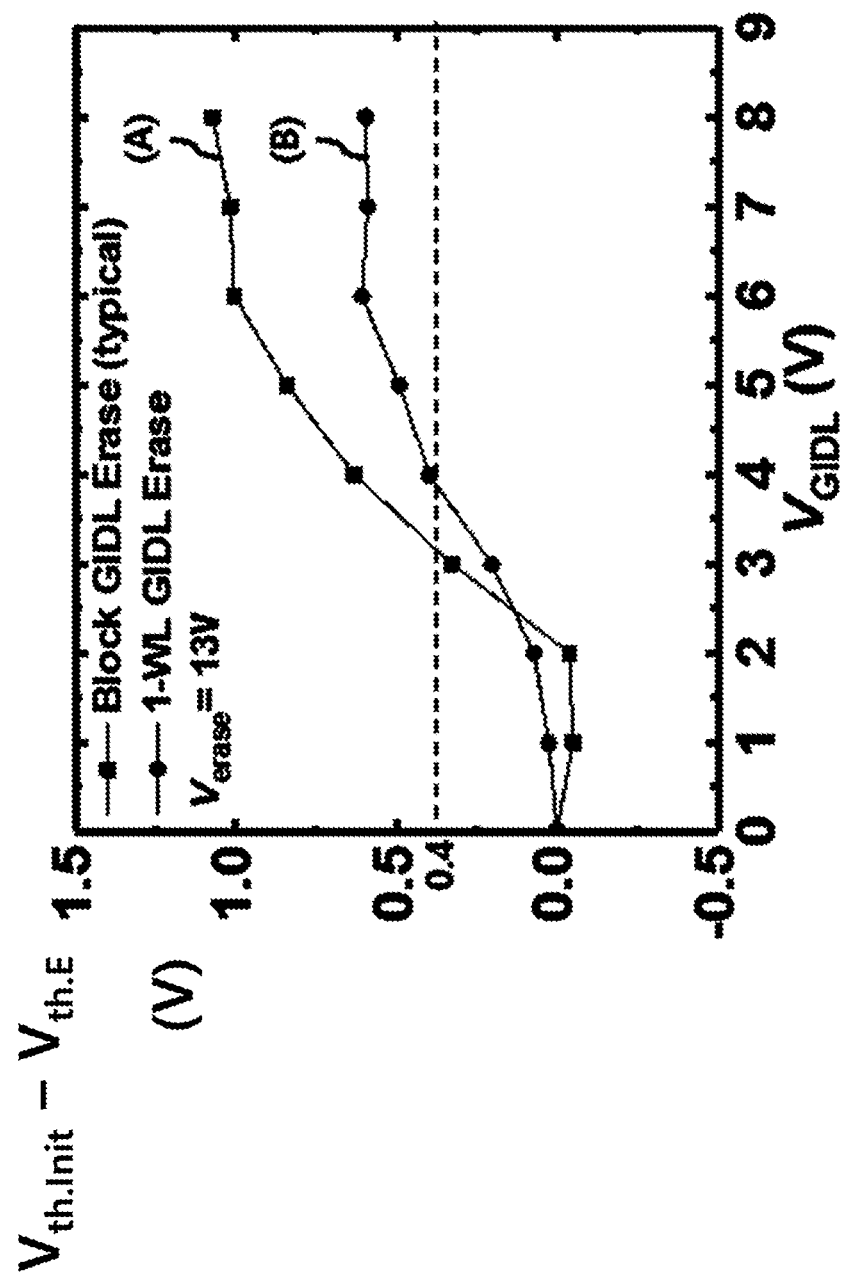
FIG. 6 is a graph showing a relationship between a GIDL voltage and change of threshold voltage of a flash memory cell of a flash memory device according to an embodiment of the present disclosure.

FIG. 6 is a graph illustrating a relationship between a GIDL voltage and change of a threshold voltage.

In FIG. 6, (A) corresponds to a block erase operation, and (B) corresponds to a cell erase operation.

The vertical axis represents change of a threshold voltage of a flash memory cell before and after an erase operation. $V_{th,Init}$ represents the threshold voltage of the flash memory cell before the erase operation and $V_{th,E}$ represents the threshold voltage of the flash memory cell after the erase operation. Since the threshold voltage decreases during the erase operation, the threshold voltage change $(V_{th,Init}-V_{th,E})$ after the erase operation has a positive value.

An amount of the threshold voltage change $(V_{th,Init}-V_{th,E})$ by which it is determined that the erase operation is completed may vary according to embodiments, and may be determined in advance by an experiment or a simulation.

In this embodiment, it is assumed that the erase operation is completed when the threshold voltage change $(V_{th,Init}-V_{th,E})$ becomes 0.4V. Under these conditions, in the conventional case, the block erase operation is completed when the GIDL voltage $V_{GIDL}$ is greater than or equal to about 3.2V as indicated by (A), but in the present embodiment, the cell erase operation is completed when the GIDL voltage $V_{GIDL}$ is greater than or equal to 4V as indicated by (B).

Determining a voltage of a bit line and a voltage of a string selection line according to selection while satisfying the condition of FIG. 6 may be variously changed by a person skilled in the art.

In FIG. 6, it is assumed that an erase voltage $V_{erase}$ is 13V. However, when the erase voltage $V_{erase}$ is increased to 16V, the GIDL voltage $V_{GIDL}$ required for erasing may be changed.

Figure 7:
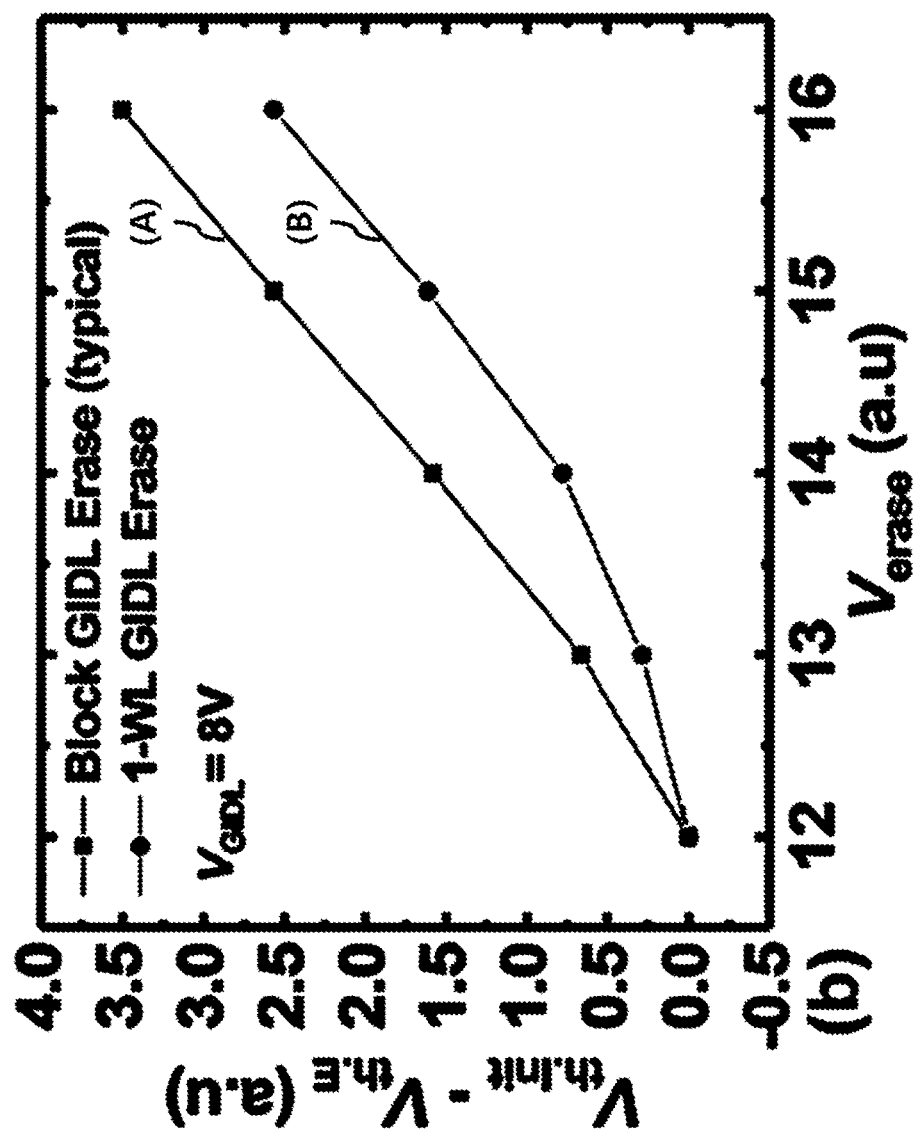
FIG. 7 is a graph showing a relationship between an erase voltage and change of a threshold voltage of a flash memory cell of a flash memory device according to an embodiment of the present disclosure.

FIG. 7 is a graph illustrating a relationship between an erase voltage and change of a threshold voltage of a flash memory cell.

In FIG. 7, (A) corresponds to a block erase operation, and (B) corresponds to a cell erase operation.

As shown in FIG. 7, when a GIDL voltage $V_{GIDL}$ is fixed, as an erase voltage $V_{erase}$ increases, the threshold voltage change $(V_{th,Init}-V_{th,E})$ increases.

Accordingly, when the erase voltage $V_{erase}$ is raised to 16V in FIG. 6, the GIDL voltage $V_{GIDL}$ may be changed.

Figure 8:
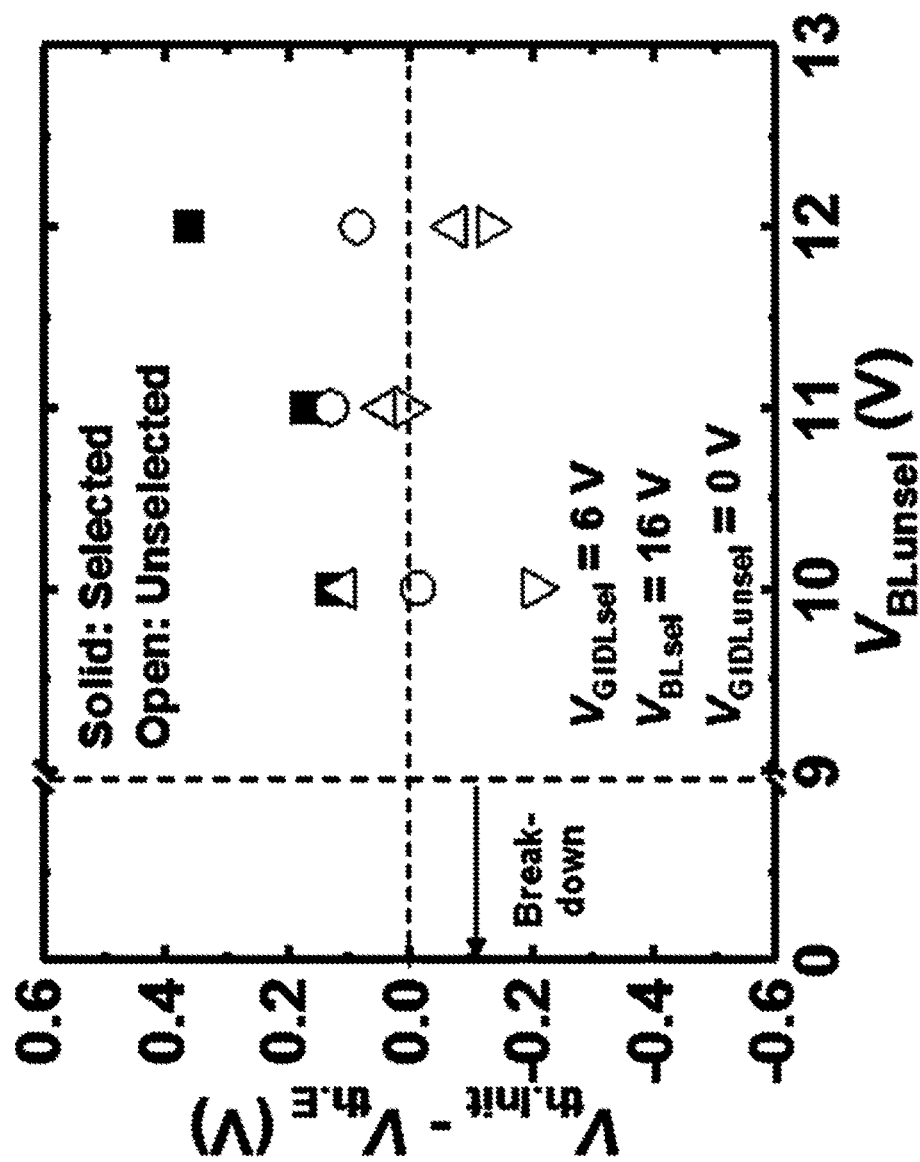
FIG. 8 is a graph showing a relationship between a voltage of an unselected bit line and change of a threshold voltage of a flash memory cell of a flash memory device according to an embodiment of the present disclosure.

FIG. 8 illustrates a relationship between a voltage of a bit line and change of a threshold voltage of a flash memory cell in an unselected NAND string.

In FIG. 8, a voltage $V_{BLsel}$ of a selected bit line is 16V, a GIDL voltage $V_{GIDLsel}$ of a selected NAND string is 6V, and a GIDL voltage $V_{GIDLunsel}$ of an unselected NAND string is 0V.

In FIG. 8, when a voltage $V_{BLunsel}$ of an unselected bit line is set to less than 9V, a voltage difference between the selected bit line and the unselected bit line increases, which causes a breakdown phenomenon.

Accordingly, the voltage $V_{BLunsel}$ of the unselected bit line must be set to 9V or higher.

FIG. 8 shows cases where voltages $V_{BLunsel}$ of the unselected bit lines are 10V, 11V, and 12V.

In FIG. 8, a flash memory cell corresponding to a black rectangle corresponds to a selected flash memory cell, and flash memory cells corresponding to the remaining shapes correspond to unselected flash memory cells.

Even if the voltage $V_{BLunsel}$ of the unselected bit line increases, the threshold voltage change ($V_{th.Init}-V_{th.E}$) of an unselected flash memory cell is insignificant.

However, the threshold voltage ($V_{th.Init}-V_{th.E}$) of the selected flash memory cell gradually increases as the voltage $V_{BLunsel}$ of the unselected bit line increases.

For example, when the voltage $V_{BLunsel}$ of the unselected bit line is 12V, the threshold voltage change ($V_{th.Init}-V_{th.E}$) of the selected flash memory cell increases to 0.4V or higher.

If a higher voltage is applied to the unselected bit line, i.e., if the voltage $V_{BLunsel}$ of the unselected bit line increases, the threshold voltage change ($V_{th.Init}-V_{th.E}$) of the selected flash memory cell may increase. On the other hand, a threshold voltage of an unselected flash memory cell varies greatly as a GIDL voltage $V_{GIDLunsel}$ between an unselected bit line and an arbitrary string selection line increases.

A low voltage may be applied to an unselected bit line to prevent GIDL from occurring in the unselected bit line, but as described above, breakdown may occur. To prevent the breakdown from occurring, a space between bit lines may be increased, but this is not preferable because it degrades cell integration.

Figure 9:
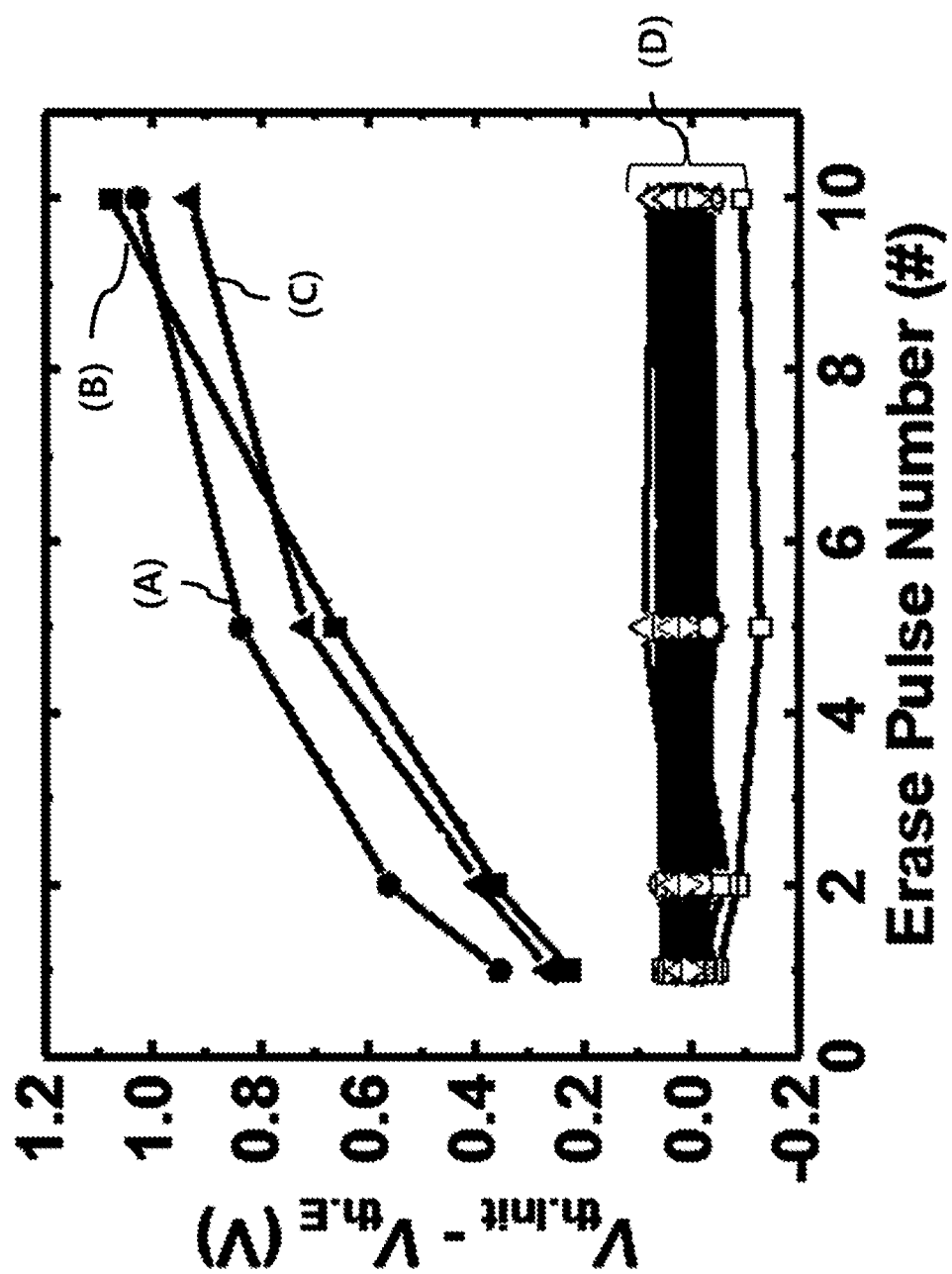
FIG. 9 is a graph showing a relationship between location of a flash memory cell and change of a threshold voltage of a flash memory cell of a flash memory device according to an embodiment of the present disclosure.

FIG. 9 is a graph illustrating a relationship between a position of a selected flash memory cell and change of a threshold voltage of the selected flash memory cell.

In FIG. 9, (A) corresponds to a case in which the selected flash memory cell is located in the middle of a NAND string, e.g., the NAND string 200 in FIG. 1, (B) corresponds to a case in which the selected flash memory cell is located at the bottom of the NAND string 200, and (C) corresponds to a case in which the selected flash memory cell is located at the top of the NAND string 200, and (D) corresponds to an unselected flash memory cell.

As illustrated in (D) of FIG. 9, change of a threshold voltage ($V_{th.Init}-V_{th.E}$) of the unselected flash memory cell is insignificant regardless of the number of erase pulses that is the number of erase operations.

However, it can be seen that the threshold voltage change ($V_{th.Init}-V_{th.E}$) of the selected flash memory cell is similar to each other regardless of the location of the selected flash memory cell, and the threshold voltage ($V_{th.Init}-V_{th.E}$) of the selected flash memory cell increases as the number of erase operations increases.

Through this, it can be seen that a threshold voltage of a specific flash memory cell needs to be adjusted to a desired level when an erase operation for the specific flash memory cell is repeated.

Figure 10:
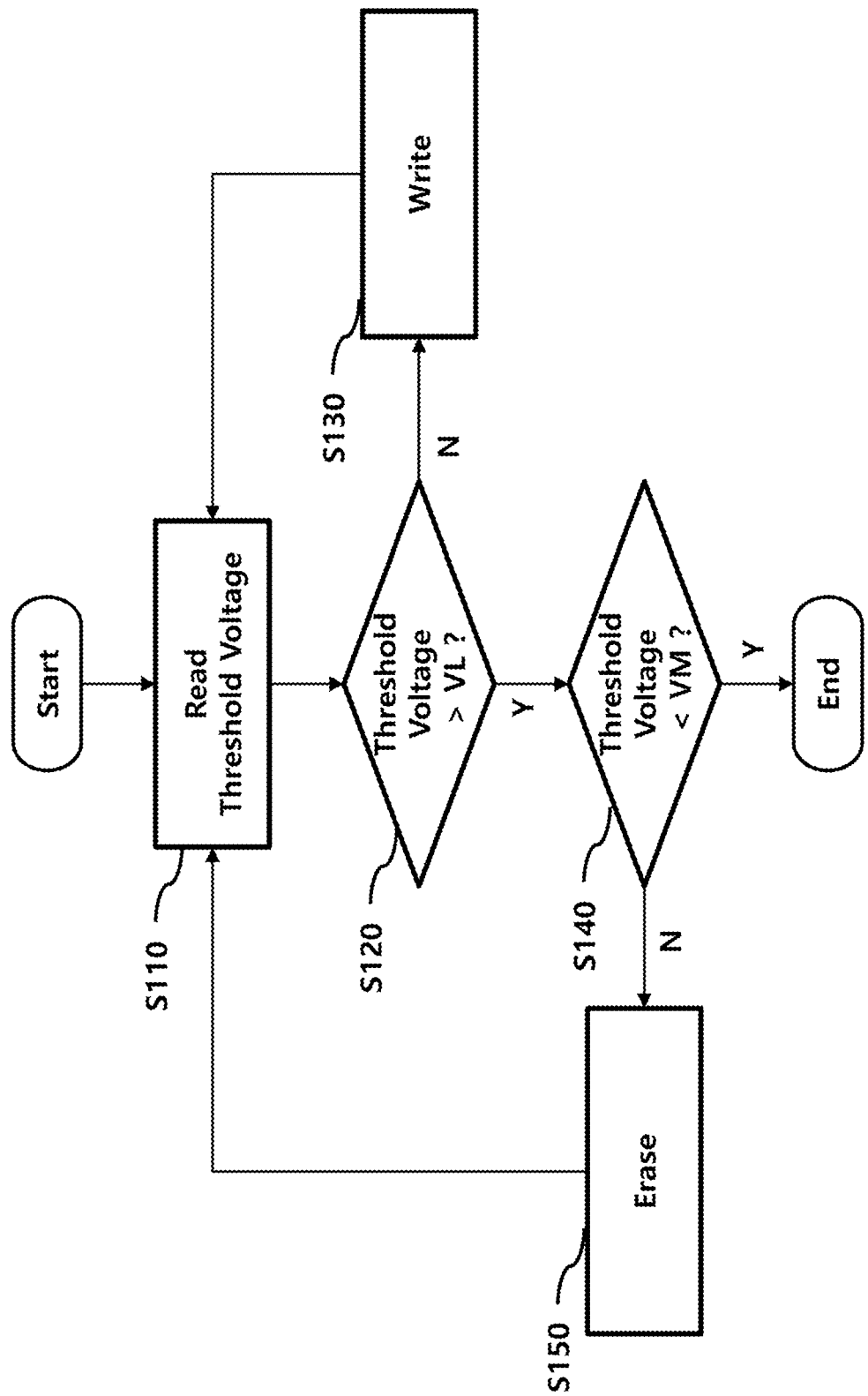
FIGS. 10 and 11 illustrate operations of a flash memory device according to an embodiment of the present disclosure.
Figure 11:
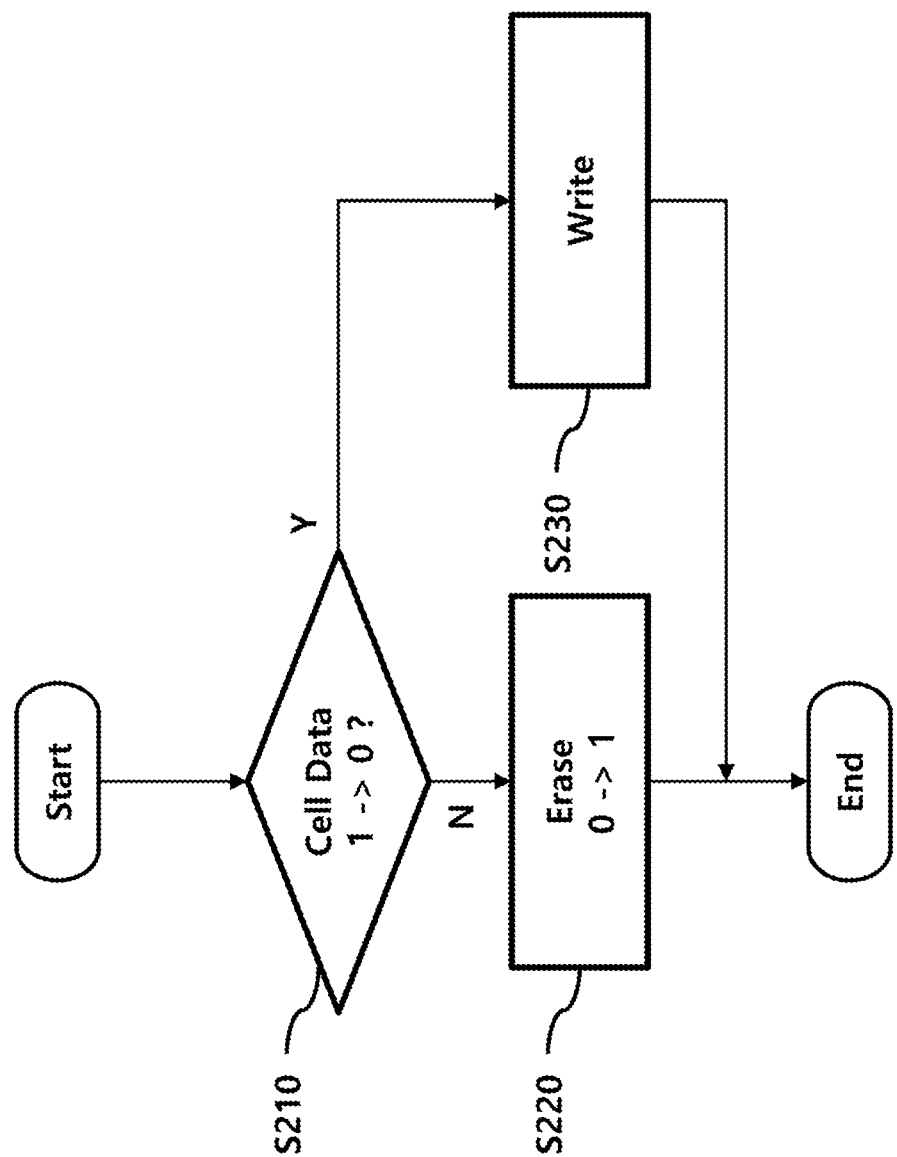

FIGS. 10 and 11 are flowcharts illustrating operations of a flash memory according to an embodiment of the present disclosure. The operations of FIGS. 10 and 11 may be performed by the above-described control circuit.

FIG. 10 illustrates an embodiment in which a write operation or an erase operation is performed on a selected flash memory cell so that a threshold voltage of the selected flash memory cell falls within a predetermined range between a lower limit VL and an upper limit VM.

In this case, the upper limit VM and the lower limit VL may be differently determined according to cell data.

First, the threshold voltage of the selected flash memory cell is read at S110.

After that, whether the threshold voltage is greater than the lower limit VL or not is determined at S120. If the threshold voltage is less than or equal to the lower limit VL, the write operation is performed on the selected flash memory cell at S130, and the process goes back to S110.

On the other hand, if the threshold voltage exceeds the lower limit VL, i.e., if the threshold voltage is greater than the lower limit VL, whether the threshold voltage is less than the upper limit VM or not is determined at S140.

If the threshold voltage is equal to or greater than the upper limit VM, the erase operation is performed on the selected flash memory cell at S150 and the process goes back to S110. On the other hand, if the threshold voltage is less than the upper limit VM, the process is terminated.

The operation of FIG. 10 shows that when a threshold voltage of a specific flash memory cell deviates from a normal threshold voltage distribution corresponding to the predetermined range and thus causes an error, the write operation or the erase operation may be performed on the specific flash memory cell to maintain the threshold voltage within the predetermined range without using an ECC circuit.

Accordingly, even if a complicated circuit such as the ECC circuit is not used, errors can be reduced.

Moreover, even if the ECC circuit is still used, it is possible to reduce complexity of the ECC circuit by maintaining the error correction capability of the ECC circuit to a minimum level.

In another embodiment, a re-write operation may be performed on the specific flash memory cell to improve data retention characteristics of the specific flash memory cell.

In this case, an increase of the threshold voltage of the specific flash memory cell may cause a problem, but as shown in FIG. 9, by performing an erase operation together, it is possible to prevent the increase of the threshold voltage of the specific flash memory cell and improve the data retention characteristics of the specific flash memory cell.

By using the technique described in FIG. 10, in an embodiment in which a flash memory cell is used to store a weight of a synapse in a memory-based neural network, distribution of weights of synapses can be greatly reduced, and the accuracy of neural network operations can be greatly improved.

The operation of FIG. 10 may be advantageously applied in a situation in which cell data corresponding to a specific bit among multi-bit data is modified. Such an operation may be frequently performed, for example, when a weight of a neural network is changed.

In another embodiment, the operation of FIG. 10 may further include writing a predetermined number of flash memory cells included in a block, the block including a plurality of NAND strings each including a plurality of flash memory cells before reading the threshold voltage of the selected flash memory cell at S110. The threshold voltage of the selected flash memory cell is compared with a target value, e.g., the lower limit VL and/or the upper limit VM, thereby writing or erasing the selected flash memory cell according to a comparison result. The predetermined number of flash memory cells may correspond to all flash memory cells included in the block, or the predetermined number of flash memory cells may correspond to a plurality of flash memory cells connected to a selected word line among a plurality of word lines. The writing of the predetermined number of flash memory cells includes providing a voltage for a write operation to a word line connected with the predetermined number of flash memory cells and connecting at least one of a bit line or a source line to the predetermined number of flash memory cells so that carriers, e.g., holes or electrons, are provided to channels of the predetermined number of flash memory cells.

In the flowchart of FIG. 11, it is assumed that a threshold voltage is low when data of a flash memory cell is 1, and that the threshold voltage is high when data of the flash memory cell is 0.

Accordingly, to make cell data 0, a write operation is performed on the flash memory cell, and to make the cell data 1, an erase operation must be performed on the flash memory cell.

First, it is determined whether the cell data of the flash memory cell is changed from 1 to 0 at S210.

When the cell data is changed from 0 to 1, the erase operation is performed on the flash memory cell to decrease the threshold voltage at S220. On the other hand, when the cell data is changed from 1 to 0, the write operation is performed on the flash memory cell to increase the threshold voltage at S230.

The present invention can be applied to various embodiments as follows.

After a block erase operation is performed in a NAND flash memory device and a write operation is performed by performing an incremental step pulse program (ISPP) operation, when a flash memory cell with a large threshold voltage distribution is found, a cell erase operation is performed on the flash memory cell to reduce threshold voltage distribution as well as a threshold voltage of the flash memory cell.

In a NAND flash memory device, a block-wise write operation is performed to increase threshold voltages of all flash memory cells in a block, and an incremental step pulse erase (ISPE) operation is performed to lower a threshold voltage of a selected flash memory cell and to control threshold voltage distribution of the selected flash memory cell.

In a NAND flash memory device, a write operation is performed by units of word lines to increase threshold voltages of all flash memory cells connected to a selected word line, and an incremental step pulse erase (ISPE) operation is performed to lower a threshold voltage of a selected flash memory cell and to control threshold voltage distribution of the selected flash memory cell.

In this case, a coarse tuning operation for coarsely adjusting a threshold voltage and a fine tuning operation for finely adjusting the threshold voltage may be performed together.

When a flash memory cell stores multi-level data, threshold voltage distribution thereof may have more sensitive effect on data accuracy. In this case, a cell erase operation may be performed on one flash memory cell to reduce threshold voltage distribution.

As described above, when an error occurs in a specific flash memory cell, a threshold voltage of the specific flash memory cell is adjusted to be within a desired range by selectively performing an erase operation and a write operation on the specific flash memory cell instead of using an ECC circuit.

When an error occurs due to the change of a threshold voltage caused by a read operation, which is a read disturbance, in a flash memory device, a failed bit may be processed by selectively performing an erase operation and a write operation.

When a failed bit occurs during a re-write operation in the flash memory device, the failed bit may be processed by selectively performing an erase operation and a write operation.

Therefore, in an embodiment, the operation shown in FIG. 11 may further include finding a target flash memory cell where an error occurs in data read from the flash memory device, and designating the target flash memory cell as a selected flash memory cell.

When a synapse weight of a neural network is stored in the flash memory device, a threshold voltage of a flash memory cell can be precisely adjusted by selectively performing a write operation and an erase operation on the flash memory cell.

When a synapse weight stored in a flash memory cell is changed, the synapse weight may be modified by selectively performing an erase operation and a write operation on the flash memory cell.

Therefore, in an embodiment, the operation shown in FIG. 11 may further include finding a target flash memory cell corresponding to a synapse weight to be changed among synapse weights of the neural network stored in the flash memory device, and designating the flash memory cell as a selected flash memory cell.

In memory-based artificial intelligence technology, it is important to accurately adjust a turn-on current flowing through a NAND string in order to increase inference accuracy.

For example, when a threshold voltage of a flash memory cell increases, a turn-on current decreases, and when a threshold voltage of a flash memory cell decreases, a turn-on current increases.

Accordingly, when the turn-on current is smaller than a target value, the turn-on current can be increased by lowering the threshold voltage of the flash memory cell by performing a cell erase operation on the flash memory cell. On the other hand, when the turn-on current is greater than the target value, the turn-on current can be decreased by raising the threshold voltage by performing a write operation on the flash memory cell.

Therefore, in an embodiment, an operation method of a flash memory device includes reading a turn-on current flowing through a selected flash memory cell among a plurality of flash memory cells included in a NAND string of the flash memory device, and comparing the turn-on current with a threshold value and erasing or writing the selected flash memory cell according to a comparison result.

Although various embodiments have been illustrated and described, various changes and modifications may be made to the described embodiments without departing from the spirit and scope of the invention as defined by the following claims.

What is claimed is:

1. A flash memory device comprising:
 a cell array including a first NAND string having a plurality of first flash memory cells having control gates connected to a plurality of word lines, respectively, and a first bit line selection switch connecting the plurality of first flash memory cells to a first bit line according to a control of a first string selection line; and a control circuit configured to control a first erase operation for erasing a selected flash memory cell among the plurality of first memory cells, wherein the control circuit controls a voltage difference between the first bit line and the first string selection line to have a first value for generating gate induced drain leakage (GIDL) at the first bit line selection switch, and controls a voltage of a control gate of the selected flash memory cell and a voltage of a control gate of an unselected flash memory cell among the plurality of first flash memory cells to be different from each other, wherein the cell array further comprises a second NAND string having a plurality of second flash memory cells having control gates connected to the plurality of word lines, respectively, and a second bit line selection switch connecting the plurality of second flash memory cells to the first bit line according to a control of a second string selection line, and wherein the control circuit controls a voltage difference between the first bit line and the second string selection line to have a second value that is smaller than the first value during the first erase operation.

2. The flash memory device of claim 1, wherein the cell array further comprises a third NAND string having a plurality of third flash memory cells having control gates connected to the plurality of word lines, respectively, and a third bit line selection switch connecting the plurality of third flash memory cells to a second bit line according to the control of the first string selection line, wherein the control circuit controls a voltage difference between the second bit line and the first string selection line to have a third value that is smaller than the first value during the first erase operation.

3. The flash memory device of claim 2, wherein the cell array further comprises a fourth NAND string having a plurality of fourth flash memory cells having control gates connected to the plurality of word lines, respectively, and a fourth bit line selection switch connecting the plurality of fourth flash memory cells to the second bit line according to the control of the second string selection line, wherein the control circuit controls a voltage difference between the second bit line and the second string selection line to have a fourth value that is smaller than the first value during the first erase operation.

4. The flash memory device of claim 2, wherein the control circuit controls a voltage of the second bit line to be smaller than a voltage of the first bit line during the first erase operation.

5. The flash memory device of claim 2, wherein the control circuit controls a voltage of the second bit line to be smaller than a voltage of the first bit line and to be greater than a voltage of the first string selection line.

6. The flash memory device of claim 2, wherein the first NAND string further includes a first source line selection switch connecting the plurality of first flash memory cells to the source line according to a control of a source selection line, and wherein the second NAND string further includes a second source line selection switch connecting the plurality of second flash memory cells to the source line according to the control of the source selection line, wherein the third NAND string further includes a third source line selection switch connecting the plurality of third flash memory cells to the source line according to the control of the source selection line, and wherein the control circuit controls a voltage difference between the source selection line and the source line to have a seventh value that is smaller than the first value.

7. The flash memory device of claim 6, wherein the control circuit further performs a second erase operation to erase all of the plurality of first flash memory cells, the plurality of second flash memory cells, and the plurality of third flash memory cells, and wherein in the second erase operation, the control circuit controls a voltage difference between the source selection line and the source line to have the first value or a value for generating GIDL at the first source line selection switch, the second source line selection switch, and the third source line selection switch, and controls voltages of control gates of the plurality of first flash memory cells, the plurality of second flash memory cells, and the plurality of third flash memory cells to have a voltage level for erasing the plurality of first flash memory cells, the plurality of second flash memory cells, and the plurality of third flash memory cells.

8. The flash memory device of claim 3, wherein the first NAND string further includes a first source line selection switch connecting the plurality of first flash memory cells to the source line according to a control of a source selection line, wherein the second NAND string further includes a second source line selection switch connecting the plurality of second flash memory cells to the source line according to the control of the source selection line, wherein the third NAND string further includes a third source line selection switch connecting the plurality of third flash memory cells to the source line according to the control of the source selection line, wherein the fourth NAND string further includes a fourth source line selection switch connecting the plurality of fourth flash memory cells to the source line according to the control of the source selection line, and wherein the control circuit controls a voltage difference between the source selection line and the source line to have an eighth value that is smaller than the first value.

9. The flash memory device of claim 8, wherein the control circuit further performs a second erase operation to erase all of the plurality of first flash memory cells, the plurality of second flash memory cells, the plurality of third flash memory cells, and the plurality of fourth memory cells, and wherein in the second erase operation, the control circuit controls a voltage difference between the source selection line and the source line to have the first value or a value for generating GIDL at the first source line selection switch, the second source line selection switch, the third source line selection switch, and the fourth source line selection switch, and controls voltages of control gates of the plurality of first flash memory cells, the plurality of second flash memory cells, the plurality of third flash memory cells, and the plurality of fourth flash memory cells to have a voltage level for erasing the plurality of first flash memory cells, the plurality of second flash memory cells, the plurality of third flash memory cells, and the plurality of fourth flash memory cells.

10. The flash memory device of claim 1, wherein the control circuit controls a voltage of the second string selection line to be smaller than a voltage of the first bit line and to be greater than a voltage of the first string selection line.

11. The flash memory device of claim 1, wherein the first NAND string further includes a first source line selection switch configured to connect the plurality of first flash memory cells to a source line according to a control of a source selection line,
wherein the control circuit controls a voltage difference between the source selection line and the source line to have a fifth value that is smaller than the first value.

12. The flash memory device of claim 11, wherein the control circuit further performs a second erase operation to erase all of the plurality of first flash memory cells, and
wherein in the second erase operation, the control circuit controls a voltage difference between the source selection line and the source line to have the first value or a value for generating GIDL at the first source line selection switch, and controls voltages of control gates of the plurality of first flash memory cells to have a voltage level for erasing the plurality of first flash memory cells.

13. The flash memory device of claim 1, wherein the first NAND string further includes a first source line selection switch connecting the plurality of first flash memory cells to the source line according to a control of a source selection line and the second NAND string further includes a second source line selection switch connecting the plurality of second flash memory cells to the source line according to the control of the source selection line,
wherein the control circuit controls a voltage difference between the source selection line and the source line to have a sixth value that is smaller than the first value.

14. The flash memory device of claim 13, wherein the control circuit further performs a second erase operation to erase all of the plurality of first flash memory cells and the plurality of second flash memory cells, and
wherein in the second erase operation, the control circuit controls a voltage difference between the source selection line and the source line to have the first value or a value for generating GIDL at the first source line selection switch and the second source line selection switch, and controls voltages of control gates of the plurality of first flash memory cells and the plurality of second flash memory cells to have a voltage level for erasing the plurality of first flash memory cells and the plurality of second flash memory cells.

15. The flash memory device of claim 1, wherein the control circuit performs the first erase operation on the selected flash memory cell when a threshold voltage of the selected flash memory cell is greater than an upper limit and performs a write operation on the selected flash memory cell when the threshold voltage of the selected flash memory cell is smaller than a lower limit.

16. The flash memory device of claim 1, wherein the control circuit controls a voltage of a control gate of the selected flash memory cell to be lower than a voltage of a control gate of an unselected flash memory cell.

17. The flash memory device of claim 1, wherein the cell array further includes a plurality of switches configured to connect the plurality of word lines with control gates of the plurality of first flash memory cells,
wherein the control circuit controls the plurality of switches so that a control gate of a flash memory cell other than the selected flash memory cell be separated from a corresponding word line.

18. The flash memory device of claim 1, wherein the cell array further includes a plurality of switches configured to connect the plurality of word lines to control gates of the plurality of first flash memory cells,
wherein the control circuit controls the plurality of switches so that control gates of the selected flash memory cell and one or more unselected flash memory cells adjacent to the selected flash memory cell be connected to corresponding word lines among the plurality of word lines,
wherein the control circuit controls the plurality of switches so that a control gate of an unselected flash memory cell, other than the selected flash memory cell and the one or more unselected flash memory cells, be separated from a corresponding word line among the plurality of word lines, and
wherein the control circuit controls a voltage of a control gate of the selected flash memory cell to be different from voltages of control gates of the one or more unselected flash memory cells.

19. An operation method of the flash memory device according to claim 1, the method comprising:
reading a threshold voltage of a selected flash memory cell included in a NAND string of the flash memory device;
erasing the selected flash memory cell when the threshold voltage is greater than an upper limit; and
writing the selected flash memory cell when the threshold voltage is smaller than a lower limit.

20. The operation method of claim 19, wherein the upper limit and the lower limit respectively correspond to an upper limit and a lower limit of desired threshold voltage distribution corresponding to a data level of the selected flash memory cell.

21. An operation method of the flash memory device according to claim 1, the method comprising:
writing a selected flash memory cell included in a NAND string of the flash memory device when changing data of the selected flash memory cell into first data; and
erasing the selected flash memory cell when changing data of the selected flash memory cell into second data.

22. The operation method of claim 21, further comprising:
finding a target flash memory cell where an error occurs in data read from the flash memory device; and
designating the target flash memory cell as the selected flash memory cell.

23. An operation method of the flash memory device according to claim 1, the method comprising:
reading a turn-on current flowing through a selected flash memory cell among a plurality of flash memory cells included in a NAND string of the flash memory device; and
comparing the turn-on current with a threshold value and erasing or writing the selected flash memory cell according to a comparison result.

24. The operation method of claim 23, further comprising writing all of the plurality of flash memory cells included in the NAND string.

25. An operation method of a flash memory device, the method comprising:
writing a selected flash memory cell included in a NAND string of the flash memory device when changing data of the selected flash memory cell into first data;
erasing the selected flash memory cell when changing data of the selected flash memory cell into second data;
finding a target flash memory cell corresponding to a synapse weight to be changed among synapse weights of a neural network stored in the flash memory device; and designating the flash memory cell as the selected flash memory cell.

26. An operation method of a flash memory device, the method comprising:
   writing a predetermined number of flash memory cells included in a block, the block including a plurality of NAND strings each including a plurality of flash memory cells;
   reading a threshold voltage of a selected flash memory cell among the predetermined flash memory cells; and
   comparing the threshold voltage of the selected flash memory cell with an upper limit and a lower limit;
   writing the selected flash memory cell when the threshold voltage of the selected flash memory cell is smaller than the lower limit; and
   erasing the selected flash memory cell when the threshold voltage of the selected flash memory cell is greater than the upper limit.

27. The operation method of claim 26, wherein the predetermined number of flash memory cells correspond to all flash memory cells included in the block.

28. The operation method of claim 26, wherein the predetermined number of flash memory cells correspond to a plurality of flash memory cells connected to a selected word line among a plurality of word lines.

29. The operation method of claim 26, wherein writing the predetermined number of flash memory cells includes providing a voltage for a write operation to a word line connected with the predetermined number of flash memory cells; and connecting at least one of a bit line or a source line to the predetermined number of flash memory cells so that carriers are provided to channels of the predetermined number of flash memory cells.

* * * * *